(12) United States Patent
Danielsson et al.

(10) Patent No.: US 8,409,436 B2
(45) Date of Patent: *Apr. 2, 2013

(54) ROTARY DISC FILTER AND MODULE FOR CONSTRUCTING SAME

(75) Inventors: Åke Danielsson, Skanör (SE); Åke Ralvert, Hässleholm (SE); Emil Svensson, Trelleborg (SE); Per Larsson, Trelleborg (SE)

(73) Assignee: Veolia Water Solutions & Technologies Support, Saint Maurice (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/174,879

(22) Filed: Jul. 1, 2011

(65) Prior Publication Data

US 2012/0000842 A1    Jan. 5, 2012

Related U.S. Application Data

(63) Continuation of application No. 12/569,979, filed on Sep. 30, 2009, now Pat. No. 7,972,508, which is a continuation of application No. 10/546,477, filed as application No. PCT/SE2004/000240 on Feb. 24, 2004, now Pat. No. 7,597,805.

(30) Foreign Application Priority Data

Feb. 27, 2003    (SE) ...................................... 0300532

(51) Int. Cl.
B01D 33/23    (2006.01)

(52) U.S. Cl. .......................... 210/232; 210/331; 210/486

(58) Field of Classification Search .................. 210/232, 210/331, 486

See application file for complete search history.

(56) References Cited

U.S. PATENT DOCUMENTS

| | | | |
|---|---|---|---|
| 3,163,601 A | | 12/1964 | Ericson et al. |
| 3,193,105 A | * | 7/1965 | Putnam ........................ 210/331 |
| 3,331,512 A | * | 7/1967 | Vore ............................. 210/487 |
| 3,363,770 A | | 1/1968 | Glos, II |
| 3,610,419 A | | 10/1971 | Vallee |
| 4,865,732 A | | 9/1989 | Garrant et al. |
| 4,950,403 A | | 8/1990 | Hauff et al. |
| 5,084,174 A | | 1/1992 | Perala et al. |
| 5,242,590 A | | 9/1993 | Thomson et al. |
| 5,304,304 A | | 4/1994 | Jakobson et al. |
| 5,635,062 A | | 6/1997 | Cameron et al. |
| 5,804,071 A | | 9/1998 | Haeffner |
| 6,231,761 B1 | | 5/2001 | Mohlin et al. |
| 7,255,723 B2 | | 8/2007 | Choi et al. |
| 7,293,659 B2 | | 11/2007 | Grace |
| 7,597,805 B2 | * | 10/2009 | Danielsson et al. .......... 210/232 |
| 7,972,508 B2 | * | 7/2011 | Danielsson et al. .......... 210/232 |

FOREIGN PATENT DOCUMENTS

| | | |
|---|---|---|
| JP | 63-219691 | 9/1988 |
| JP | 8-506761 | 7/1996 |
| JP | 2002-508235 | 3/2002 |
| JP | 2003284906 | 10/2003 |

(Continued)

*Primary Examiner* — Thomas M Lithgow
(74) *Attorney, Agent, or Firm* — Coats & Bennett, P.L.L.C.

(57) ABSTRACT

A rotary disc filter device includes a rotary drum and one or more disc-shaped filter members secured about the drum. Each disc-shaped filter member includes a filter and a filter support comprising a series of modules. The modules each include a base that is secured to the rotary drum and a support arm projecting outwardly from the base. The modules are interconnected and disposed around the rotary drum.

27 Claims, 4 Drawing Sheets

FOREIGN PATENT DOCUMENTS

| | | |
|---|---|---|
| JP | 2004041970 | 2/2004 |
| SE | 318859 | 4/1965 |
| SE | 224131 | 1/1969 |
| SE | 9300541-1 | 1/1995 |
| SE | 9704632-0 | 8/1999 |
| SE | 9603333-7 | 6/2003 |
| WO | 91/12067 | 8/1991 |
| WO | 98/01206 | 1/1998 |
| WO | 99/30797 | 6/1999 |
| WO | 00/37159 | 6/2000 |
| WO | 00/76620 A1 | 12/2000 |

* cited by examiner

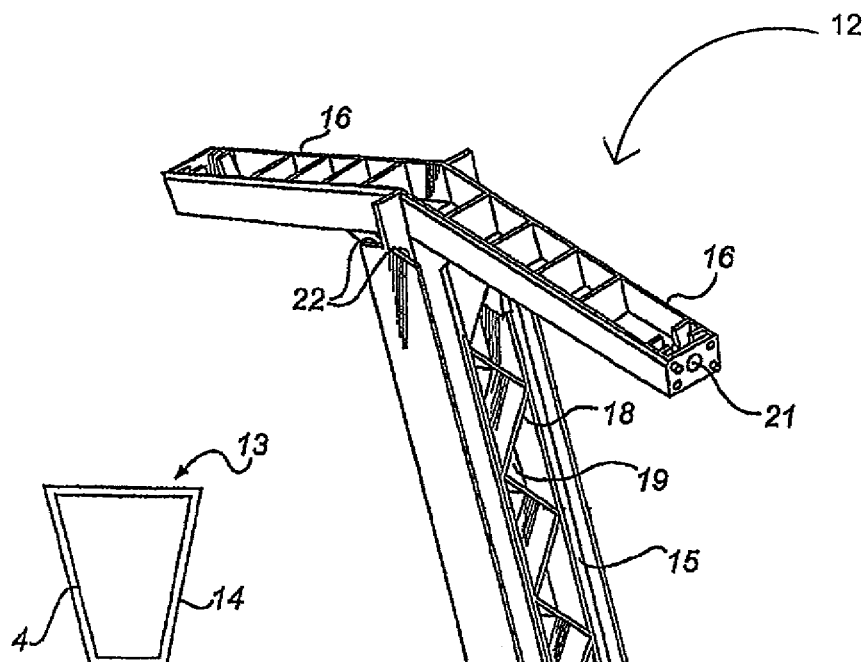
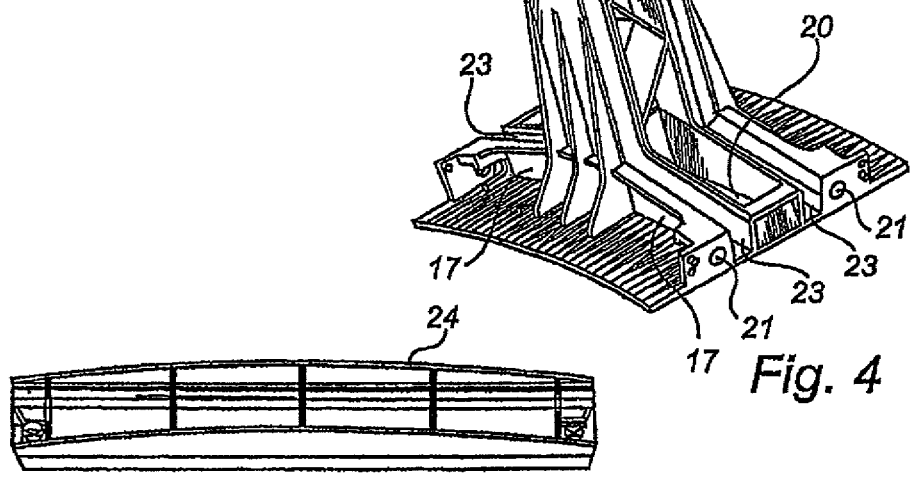
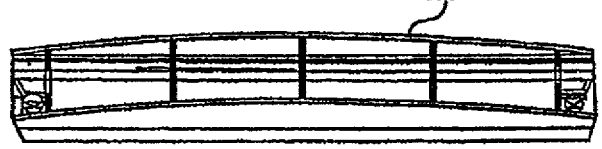

ROTARY DISC FILTER AND MODULE FOR CONSTRUCTING SAME

CROSS-REFERENCE TO RELATED APPLICATION

The present application is a continuation of U.S. patent application Ser. No. 12/569,979 filed Sep. 30, 2009 which is a continuation of U.S. patent application Ser. No. 10/546,477 filed Jul. 26, 2006, which is a national stage filing under 35 U.S.C. §371 of International Application No. PCT/SE2004/000240, filed on Feb. 24, 2004. U.S. patent application Ser. No. 12/569,979 is incorporated herein by reference.

FIELD OF THE INVENTION

The present invention relates generally to a rotary disc filter. The rotary disc filter may comprise a drum having a central longitudinal axis and being rotatably arranged about the same and adapted to receive a liquid which is to be filtered. The rotary disc filter may also comprise at least one disc-shaped filter member which on the outside of the drum extends outwards in the transverse direction of the drum and which has a filter support and at least one filter portion supported thereby. Further, the rotary disc filter may comprise a first liquid duct extending from the drum through the filter member and out through the filter portion, the filter portion being made of filter segments, which are detachably secured to the filter support. The invention also relates to a module for building a filter support for a rotary disc filter.

BACKGROUND ART

Rotary disc filters are identified in, for example, Swedish Patent Application No. SE-C-224,131. In this filter, water is conducted through one end of a central rotatable drum and through openings in the circumference of the drum radially outwards to disc-shaped filter chambers. Each of the filter chambers are defined by a disc-shaped filter member having opposing filter portions which are supported by an annular filter support arranged between the same. The filter members are mounted in parallel along the longitudinal axis of the drum. When water flows out through the filter portions, particles are retained in the filter chambers. When cleaning the filter portions, the drum is rotated and water is flushed onto the filter portions from outside in the upper area of the rotary disc filter, particles and water flowing into the upper area of the drum and being collected in a trough extending through the drum. The filter portions comprise annular filter cloth portions arranged on the sides of the filter supports.

Swedish Patent Application No. SE-B-465,857 (WO 91/12067) discloses a rotary disc filter of a similar kind, in which the disc-shaped filter members comprise a plurality of separate, disc-shaped filter sections, which together establish annular filter members. The annular filter members are divided into a plurality of separate units, and the filter cloth is divided into smaller pieces. Therefore, in case of a local damage to the cloth a replacement of the cloth is necessary on only one of the filter sections, and not on an entire annular disc.

In the two rotary disc filters described above, the filter cloth can be fastened in one of a plurality of ways. In a common solution, the filter cloth is glued directly to the filter support on opposing sides thereof. This is particularly common when the cloth consists of some textile or plastic material. The cloth can also be made of metal. In that case, it is often welded to the filter support, and if necessary, reinforcement ribs are welded to the outside of the filter cloth for improved securing thereof. In a further way of fixing the cloth to the support, the cloth is designed as a "bag" which is slipped around a filter support and is shrunk on the same.

Rotary disc filter constructions of this kind suffer from several problems. For example, the filter cloth has a limited life in normal use and must be replaced at regular intervals. Moreover, the filter cloth is sensitive and can easily be damaged, necessitating a premature replacement thereof. If the cloth is damaged, an entire filter cloth portion must be replaced.

Rotary disc filters with detachably secured filter segments have therefore been developed. Such a rotary disc filter is disclosed in, for example, WO 99/30797, which discloses a rotary disc filter which has a filter portion consisting of several filter segments. The filter segments are detachably secured to a filter support and comprise a frame and a filter cloth expanded by the frame. The frame and the filter support are made of metal. Using detachably secured filter segments makes it easier to replace parts of the filter. This rotary disc filter functions in a satisfactory manner, but it is desirable to improve it further by, for instance, making manufacture less expensive. It would also be desirable to make these rotary disc filters lighter and less bulky when dimensioned for large flows. Moreover, it would be desirable for the filter discs to entrain a smaller amount of water in their rotary motion than has been possible so far. A smaller amount of water would then accompany the particles through the trough of the rotary disc filter for drawing off filtered-off particles, which could thus increase the capacity of the rotary disc filter.

SUMMARY OF THE INVENTION

An object of the present invention is to provide a rotary disc filter which is more compact and thus has a higher filtering capacity with the same space occupied.

Another object of the present invention is to provide a rotary disc filter which is lighter than previous rotary disc filters.

A further object of the present invention is to provide a rotary disc filter can be manufactured at a lower cost.

A further object of the present invention is to provide a module that enables construction of a filter support for a more compact rotary disc filter.

Yet another object of the present invention is to provide a module that enables less expensive construction of a filter support for a rotary disc filter.

A further object of the present invention is to provide a module for building a lighter rotary disc filter.

According to one embodiment of the present invention, a disc filter may have at least one second liquid duct which extends between adjoining filter segments to provide liquid communication between the filter segments. Therefore, liquid can move between the filter segments and is not entrained in the rotary motion. As a result, the capacity of the rotary disc filter increases.

In another embodiment of the present invention, the second liquid duct may comprise hollow spaces in the filter support. Liquid communication between the filter segments can thus be provided in an extremely simply way.

The filter support between the filter segments may comprise a framework construction, whose hollow spaces constitute the second liquid ducts. In this manner, liquid communication can easily be provided, while at the same time the support can be made sufficiently strong with great economy in material.

According to another embodiment of the present invention, the filter body may be made up of modules. A rational construction can thus be ensured.

Two modules may form a filter support around a filter segment, and the two modules may then be interconnected at a distance from surrounding filter segments. This makes it possible to avoid joints between the filter segments, which makes it easier to provide a tight construction.

The filter segments can be secured to the filter support by means of grooves in the filter support which are extended in the plane of the filter segments. The filter segments can thus be safely secured to the filter support while at the same time the filter segments are easy to insert and remove. Moreover, a certain self-sealing effect can be achieved.

According to yet another embodiment of the present invention, the filter support may form at least a portion of a circumferential surface of the drum. This makes it possible to manufacture the drum with a reduced consumption of material.

The filter support may be made of plastic and can thus be manufactured at a relatively low cost. Furthermore, the filter support may be corrosion-resistant.

According to yet another embodiment of the present invention, the module for building a filter support may comprise two inner support portions and two outer support portions for at least partial enclosure of two adjoining filter segments, and an intermediate support portion adapted to be arranged between the two adjoining filter segments. Using such modules makes it possible to effectively build a filter support.

The intermediate support portion may comprise at least one liquid duct for providing liquid communication between adjoining elements. As a result, liquid can move between the filter segments and is therefore not entrained when the filter support rotates during operation of the rotary disc filter. Therefore, the capacity of the rotary disc filter can be increased.

The intermediate support portion may comprise a framework construction, the hollow spaces of which constitute liquid ducts to provide liquid communication between adjoining filter segments. The framework construction may give good strength with a minimized consumption of material and further may provide ducts for the liquid to pass between the filter segments.

One end of the outer support portions and the inner support portions may include means for interconnecting two modules. The modules can thus interconnected to form a filter support.

The inner support portions may be arranged to form portions of a circumferential surface of the drum, which makes it possible to build the drum using a small amount of material.

The outer support portions and the inner support portions may be symmetrically arranged on the intermediate support portion. Only one type of module may thus be required for building the filter support.

According to yet a further embodiment of the present invention, the module may comprise grooves for securing of filter segments. The grooves may extend in the plane of the filter segments. This makes it possible to safely secure the filter segments in a way that makes the segment easy to attach and detach.

According to a yet another embodiment of the present invention, the module is made of plastic. The module may thus be manufactured relatively inexpensively and may allow a light filter support to be built.

BRIEF DESCRIPTION OF THE DRAWINGS

The invention will now be described in more detail with reference to the accompanying schematic drawings which by way of example illustrate several embodiments of the invention.

FIG. 4 is a perspective view of an exemplary module for building a filter support, consistent with an embodiment of the present invention.

FIG. 5 is as perspective view of an exemplary closing means for securing filter segments in a rotary disc filter, consistent with an embodiment of the present invention.

FIG. 6 is a top plan view of an exemplary filter segment consistent with an embodiment of the present invention.

DETAILED DESCRIPTION

Figure 1:
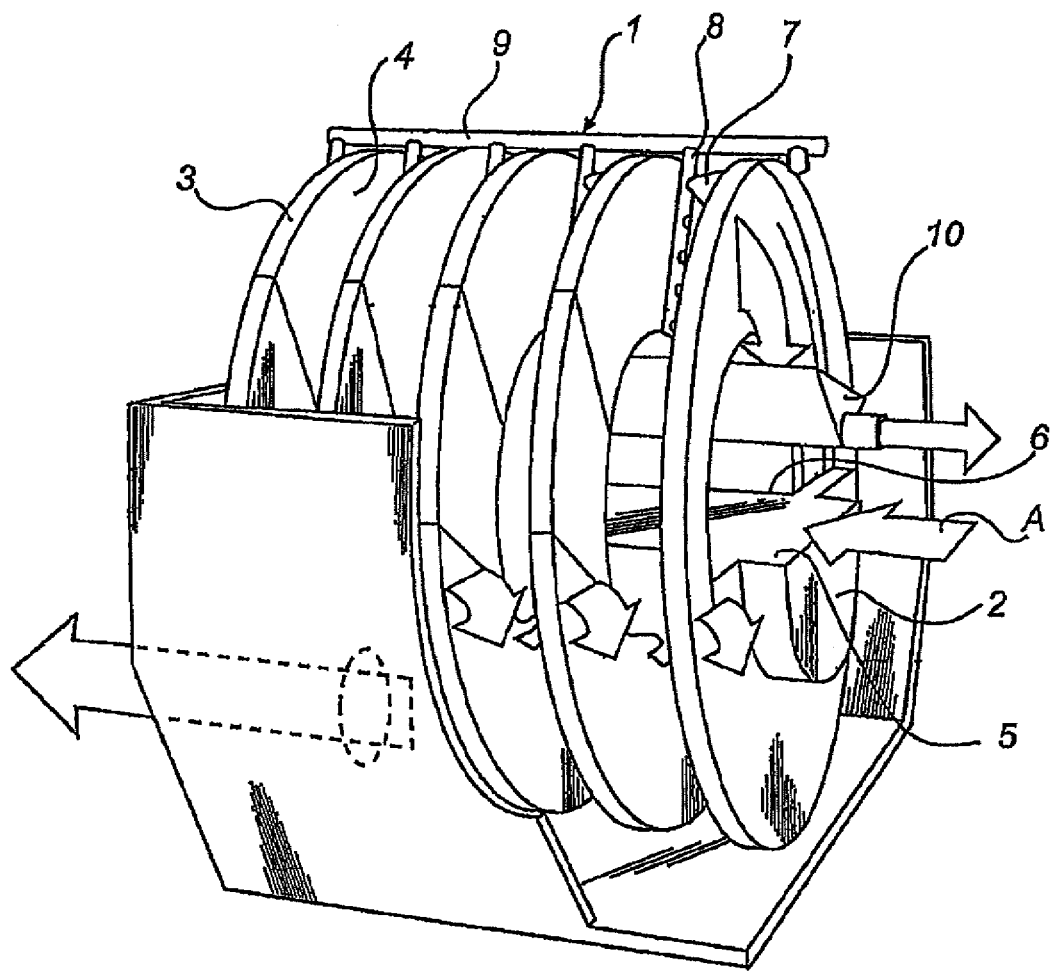
FIG. 1 is a perspective view which schematically shows the principle of a rotary disc filter according to the prior-art technique.

The fundamental function of a rotary disc filter according to one embodiment of the present invention is largely the same as for prior-art rotary disc filters of the type as shown in FIG. 1. The function of the rotary disc filter of the present invention will therefore be explained with reference to FIG. 1. The rotary disc filter 1 may have a slowly rotating drum 2 which supports a plurality of disc-shaped filter members 3, whose normal direction is parallel to and concentric with the longitudinal axis or rotary axis C of the drum 2 and whose lateral faces, which are axially directed and radially extended, support a filter cloth 4. The liquid A, which is to be filtered, is conducted through an inlet 5 to the interior of the drum 2. From the interior of the drum 2 the filtering liquid A is conducted out through openings in the circumferential surface 6 of the drum 2 to the interior of the disc-shaped filter members 3. From there, the filtering liquid A is finally conducted in a filtering direction out through the filter cloth 4. Any particles in the filtering liquid A may adhere to the inside of the filter cloth 4. The rotary disc filter 1 may include flushing nozzles 7 for cleaning of the filter cloth 4, which are mounted on a number of flush tubes 8 and which extend between the disc-shaped filter members. The flush tubes 8 may be adapted to conduct flush liquid to the flushing nozzles 7 and may be connected to an elongate liquid-conducting tube 9 which extends parallel to the centre axis C of the drum. The flushing nozzles may flush the filter cloth axially from outside, in a direction opposite to the filtering direction, and the flushed-out particles may be collected in a discharge trough 10, which is placed in the dorm 2 in the upper portion thereof.

Figure 2:
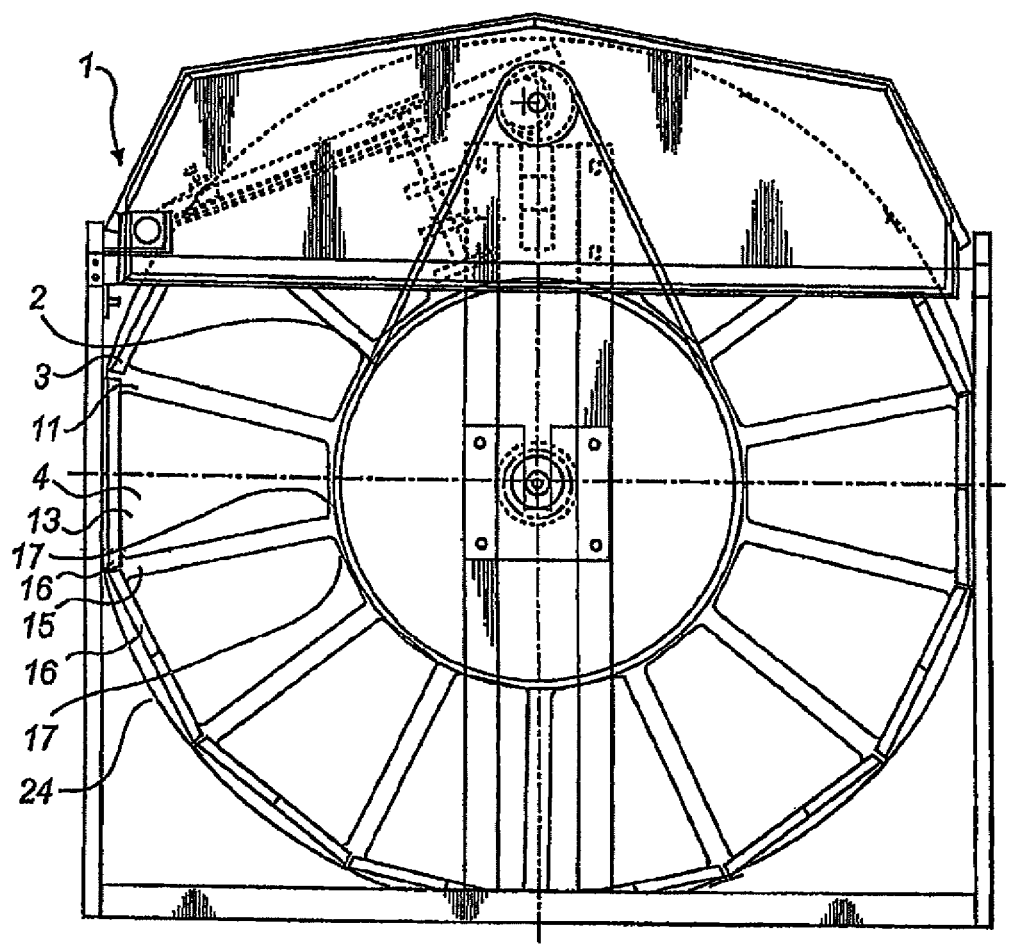
FIG. 2 is an end view of an exemplary rotary disc filter consistent with an embodiment of the present invention.
Figure 3:
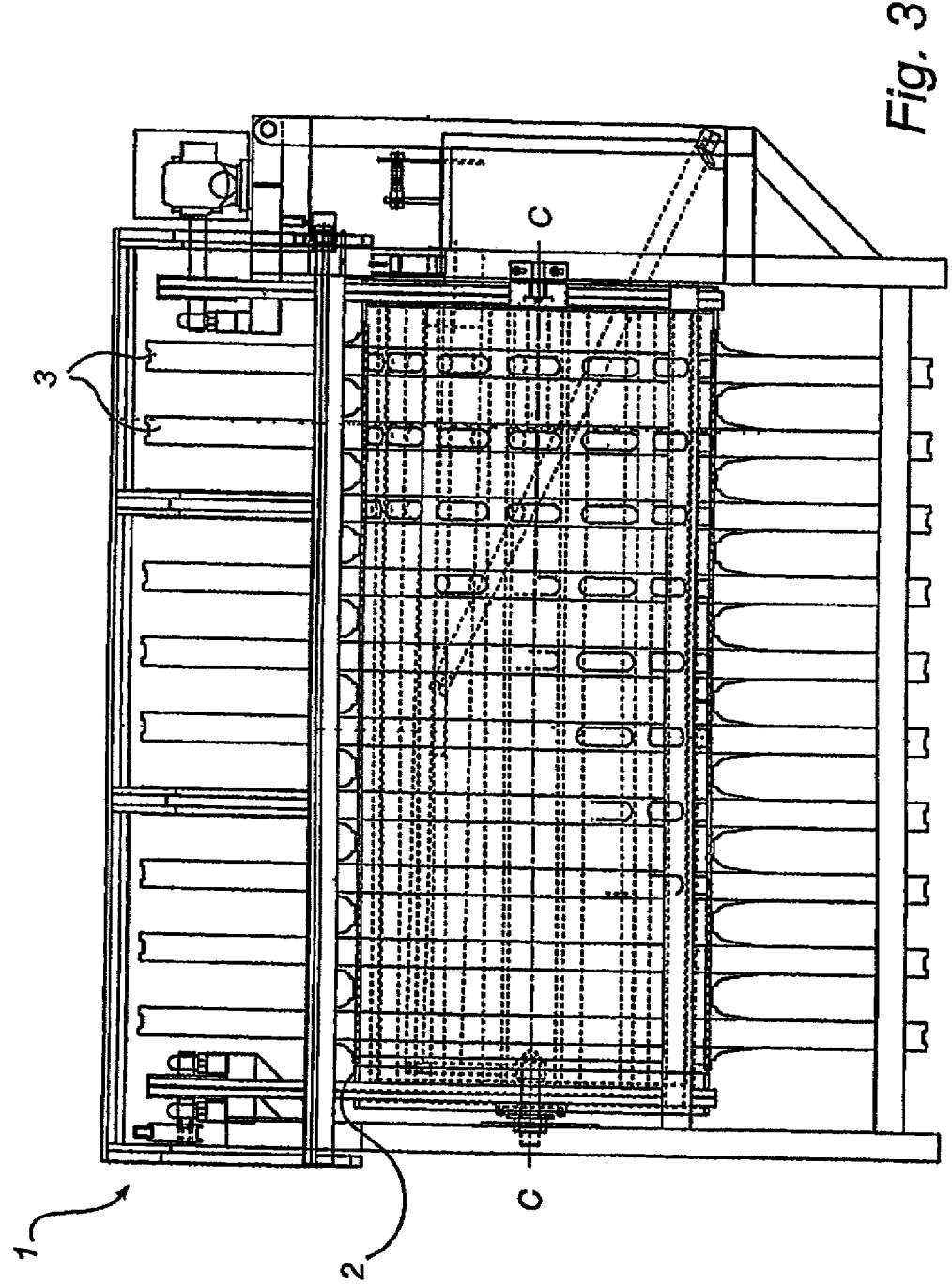
FIG. 3 is a side view of the exemplary rotary disc filter in FIG. 2, consistent with an embodiment of the present invention.

As is evident from FIG. 2, the filter members 3 may have, according to one embodiment of the present invention, a filter support 11, which extends radially outwards in the transverse direction of the drum 2 and may be made up of a plurality of modules 12. The filter support 12 forms compartments in which filter segments 13 are arranged. As shown in FIG. 6, the filter segments 13 may consist of a frame 14 which expands the filter cloth 4.

As shown in FIG. 4, the modules 12 may have an intermediate support portion 15, from one end of which extends two outer support portions 16 outwards. From the other end of the intermediate support portion 15 extends two inner support portions 17 outwards. The intermediate support portion 15 may consist of a framework construction 18 with hollow spaces 19. The inner support portions 17 may have openings 20, which allow the liquid which is to be filtered to pass from the interior of the drum 2. The inner and outer support portions 17 and 16 may have, at their ends, holds 21 for insertion of screws for interconnecting two modules 12. On both sides of the intermediate support portion 15 there may be two grooves 22, which extend parallel to the intermediate support portion 15 in the plane of the filter support 11. In each of the inner support portions 17 there may be two parallel grooves 23, which may be parallel to the inner support portion 17 and extend in the plane of the filter support 11.

FIG. 6 shows an exemplary closing means in the form of a cover 24 for securing the filter segments 13 in the filter support 11, consistent with an embodiment of the present invention.

In construction of the rotary disc filter 1, seven modules 12 may be attached to each other by means of screws in the holes 21 in such manner that the modules form a semicircle. Two such semicircles may then be mounted on the drum 2 and bolted together to form a filter support 11. By joining the modules 12 in the center of the filter segments 13, tightness may be improved compared with the case where the joining would occur between two filter segments 13.

In each of the compartments formed by the filter support 11 between two adjoining modules 12, a filter segment 13 may be inserted into the grooves 22 and 23 on both sides of the modules 12. The cover 24 may be slipped on to the outer support portions 16 of two adjoining modules 12 and the two parallel filter segments 13 which these modules 12 enclose together. The cover 24 may be screwed to the outer support portions 16 of the modules 12. A number of thus constructed disc-shaped filter members 3 may be mounted on the drum 2 to provide the rotary disc filter 1. In one embodiment, ten filter members 3 are mounted on the drum 2. However, as many as twenty-two filter members can be arranged on a drum 2 to provide a rotary disc filter 1 with greater capacity.

In operation of the rotary disc filter 1, the liquid A, preferably polluted water, which is to be filtered, may be supplied through the inlet 5 at one end of the drum 2 and is passed through a first liquid duct which extends from the interior of the drum 2 through the openings 20 in the inner support portions 17 of the modules 12 and out through the filter cloth 4 of the filter members 3. The drum 2 rotates slowly and the filter segments 13, which are positioned in the lower part of their course, are passed by the liquid A. Pollutants may then adhere to the inside of the filter cloth 4. When the filter segments 13 are positioned in the upper part of their course, they may be cleaned by means of the above-described flushing equipment 7, 8, and 9. The flushed-out pollutants may then be removed by means of the discharge trough 10.

The hollow spaces 19 in the framework construction 18 of the intermediate support portions 15 form a second liquid duct through which the liquid A can move between the filter segments 13. In contrast to previous rotary disc filters, the liquid A may therefore not be entrained in the rotary motion of the filter members 3. The amount of liquid accompanying the pollutants out through the discharge trough 10 may thus be reduced. The speed of rotation of the drum 2 can thus be increased, which means that the capacity of the rotary disc filter 1 may be increased. Therefore, the rotary disc filter 1 can be made more compact than previous rotary disc filters. Also the load exerted on the suspension and driving device of the drum is reduced.

The rotary disc filter 1 can be mounted at the factory and be delivered ready for use, but the module construction also makes it possible to deliver modules 12 for mounting the rotary disc 1 at the site where it is to be used. The module construction also makes it easy to enlarge an existing rotary disc filter 1 in order to increase its capacity. Modules 12, filter segments 13 and covers 24 for one or more new filter members 3 can then be delivered and mounted in the existing rotary disc filter 1.

According to one embodiment, the modules 12 may be made by injection moulding of ABS plastic. Other plastic materials can be used, and a suitable manufacturing process is then selected with regard to the type of plastic. Plastic is advantageous since it is a relatively inexpensive material that is easy to work, and is also corrosion resistant. Other materials may also be selected, but it should be taken into consideration that it is convenient to use a material which has a low weight in relation to its strength, thus minimizing the weight of the completed rotary disc filter.

The frame 14 of the filter segments 13 may be made of pretensioned glass fiber, which makes the frame 14 strong, light and corrosion resistant. Alternatively, the frame 14 can be made of metal, preferably stainless steel. For sealing of the filter segment 13 against the filter support 4, the frame 14 may be enclosed by a rubber strip, for example, EPDM rubber. In order to facilitate insertion and removal of the filter segments 13 in the grooves 22, the outside of the rubber strip may be flocked, which reduces friction against the filter support 11. The seal may also be promoted by the filter segments 13, as the liquid A passes out through the filter cloth 4, being pressed outwards by the liquid pressure, so that the frame 14 is pressed against the outer boundary walls of the grooves 22 and 23.

In one embodiment, the filter cloth 4, which is expanded by the frame 14, may be a microfilter cloth with filter holes in the range 10-100 μm. The filter cloth 4 may be selected according to the filtering capacity that is required.

The inventive rotary disc filter can suitably be cleaned by means of a cleaning device, for example, the cleaning device described in SE-C-515, 001 (WO 00/37159).

It will be appreciated that many modifications of the embodiments of the invention described above are feasible within the scope of the invention, which is defined in the appended claims.

In the example shown, the modules 12 may be mounted on a drum 2, the circumferential surface 6 of which has openings for the liquid to pass from the interior of the drum 2 to the filter segments 11. The lightweight modules 12 make it possible to select instead to make a skeleton for a drum and let the inner support portions 17 form the circumferential surface of the drum on the outside of the skeleton.

Instead of making the intermediate support portions 12 with a framework construction 18, the intermediate support portions can be given a flat web in which holes are bored to provide liquid communication between the filter segments.

The invention claimed is:

1. A rotary disc filter for filtering a liquid, comprising:
   (a) a rotary drum having an inlet for receiving the liquid to be filtered, the rotary drum further including an outer surface having a plurality of openings for permitting the liquid to flow from the rotary drum;
   (b) a drive for rotatively driving the rotary drum;
   (c) one or more disc shaped filter members secured on the drum and rotatable with the drum as the drum is driven;
   (d) each disc shaped filter member including a series of connected plastic modules and a plurality of filter segments disposed on each side of the disc shaped filter member;
   (e) a series of compartments disposed between the plastic modules and positioned around the drum for holding liquid to be filtered and wherein each compartment is defined in part at least by two consecutive modules and a pair of filter segments;
   (f) each plastic module comprising:
      i. a plastic base secured on the rotary drum and including an opening generally aligned with at least one of the openings in the outer surface of the rotary drum such that liquid flows from the drum, through the opening in the outer surface of the drum and through the opening in the base into at least one of the compartments;

ii. the base including a plate;

iii. the base including opposite ends and wherein each end of the base connects to the end of another base in end-to-end relationship;

iv. a plastic support arm integral with the base and projecting outwardly from the base;

v. a plurality of slots forming a part of the module for receiving and retaining portions of a plurality of the filter segments;

(g) a series of fasteners for securing the bases of the modules together in end-to-end relationship around the rotary drum.

2. The rotary disc filter of claim 1 wherein the support arm of each module includes opposed sides interconnected by a series of crossing webs.

3. The rotary disc filter of claim 1 wherein the base of each module includes a curved plate secured adjacent an opening in the outer surface of the rotary drum.

4. The rotary disc filter of claim 1 wherein each module includes a plastic rim section extending from an outer portion of the support arm.

5. The rotary disc filter of claim 1 wherein each support arm of each module includes opposed sides and wherein there is provided two slots disposed on each side of the support arm, and wherein the slots receive and retain at least portions of two filter segments.

6. The rotary disc filter of claim 5 wherein the plurality of slots extend along a portion of the support arm and also along a portion of the base.

7. The rotary disc filter of claim 1 wherein the base of each module includes a raised structure disposed on the plate and having portions elevated with respect to the plate; and wherein the raised structure of the base forms, in part at least, the opening provided in the base that permits liquid to flow from the drum through the base into at least one compartment.

8. The rotary disc filter of claim 1 wherein the disc shaped filter member includes a plastic rim structure that extends around the disc shaped filter member; and wherein the rim structure includes a plurality of plastic rim sections with each rim section connected to at least one of the modules.

9. The rotary disc filter of claim 1 wherein the base of each module includes opposed generally flat connecting surfaces that extend transversely across the base at opposite ends thereof; and wherein the modules of each disc shaped filter member are connected by connecting the connecting surfaces with the fasteners such that the bases of the modules are connected in end to end relationship around the rotary drum.

10. The rotary disc filter of claim 1 wherein each module includes only one base and only one support arm, and wherein the bases of the modules are connected together by securing the bases together in end to end relationship.

11. The rotary disc filter of claim 1 wherein each module includes separate slots for receiving and retaining portions of four separate filter segments.

12. The rotary disc filter of claim 11 wherein the slots extends along a portion of the support arm and along a portion of the base.

13. The rotary disc filter of claim 1 wherein the bases of the modules extend continuously around the rotary drum to form a hub structure around the rotary drum.

14. The rotary disc filter of claim 1 wherein the plastic support arm is a radial support arm that is elongated.

15. The rotary disc filter of claim 10 wherein in addition to the only one base and the only one support arm, each module includes two members that are integral with the support arm and which project therefrom and form a part of a rim structure of the disc shaped filter member.

16. The rotary disc filter of claim 1 wherein:

the base of each module includes a curved plate secured adjacent the outer surface of the drum;

each support arm of each module includes opposed sides and wherein there is provided at least two adjacent slots disposed on each side of the support arm for receiving a plurality of filter segments; and the disc shaped filter member includes a plastic rim structure that extends around the disc shaped filter member.

17. The rotary disc filter of claim 16 wherein:

the base of each module includes a raised structure disposed on the plate and having portions elevated with respect to the plate; and wherein the raised structure of the base forms, in part at least, the opening provided in the base that permits liquid to flow from the drum through the base into at least one compartment.

18. The rotary disc filter of claim 16 wherein the plastic rim structure includes a plurality of plastic rim sections with each rim section being connected to at least one of the modules.

19. The rotary disc filter of claim 1 wherein each consecutive pair of plastic modules have slots formed therein for receiving and holding two spaced apart filter segments such that each filter segment extends from one module to an adjacent module.

20. A rotary disc filter for filtering a liquid comprising:

a rotary drum having an inlet for receiving liquid to be filtered and a surface having a plurality of openings;

a drive for rotatively driving the rotary drum;

at least one disc shaped filter member supported on the drum and rotatable with the drum;

a series of plastic modules connected together around the drum and forming a part of the disc shaped filter member;

a series of filter segments disposed on each side of the disc shaped filter member for filtering liquid contained in the disc shaped filter member;

each module including a base and an arm extending outwardly from the base, each base including an opening generally aligned with at least one of the openings in the surface of the rotary drum such that liquid flows from the drum, through an opening in the surface of the drum and through the opening in the base;

the bases of the modules being connected together around the drum;

a series of compartments forming a part of the disc shaped filter member and disposed around the drum for receiving liquid to be filtered from the rotary drum;

each compartment being generally defined by two consecutive plastic modules and two filter segments retained by the two consecutive modules; and wherein the opening in the base of each module is configured to permit liquid to flow from the drum, through the opening in the base, and into at least one compartment after which the liquid is filtered by flowing from the compartment through the filter segments that at least partially define the compartment.

21. The rotary disc filter of claim 20 wherein each module includes slots for receiving and retaining portions of a plurality of the filter segments and wherein the slots of two adjacent modules cooperate to retain two spaced apart filter segments.

22. The rotary disc filter of claim 21 wherein the slots of each module include a series of slots disposed on the arm of each module that are open at the outer end of the slots such that the filter segments can be inserted from the periphery of the disc shaped filter member that includes the plastic modules.

23. The rotary disc filter of claim 20 wherein the bases of the modules are connected together in end-to-end relationship around the drum and form a hub around the drum.

24. The rotary disc filter of claim 20 wherein the base of each module includes a curved plate secured adjacent an opening in the surface of the rotary drum.

25. The rotary disc filter of claim 20 wherein the base of each module includes a raised structure disposed on a plate and having portions elevated with respect to the plate; wherein the raised structure of the base forms, in part at least, the opening provided in the base that permits liquid to flow from the drum through the base.

26. The rotary disc filter of claim 20 wherein the disc shaped filter member includes a plastic rim structure that extends around the disc shaped filter member; and wherein the rim structure includes a plurality of plastic rim sections with each rim section connected to at least one of the modules.

27. The rotary disc filter of claim 20 wherein each module includes only one base and one arm.

* * * * *